United States Patent [19]

Welk

[11] 4,343,242

[45] Aug. 10, 1982

[54] LASER-TRIGGERED CHEMICAL ACTUATOR FOR HIGH VOLTAGE ISOLATION

[75] Inventor: Steven Welk, Lansdale, Pa.

[73] Assignee: Gould Inc., Rolling Meadows, Ill.

[21] Appl. No.: 144,651

[22] Filed: Apr. 28, 1980

[51] Int. Cl.$^3$ .............................................. F42C 19/00
[52] U.S. Cl. .................................. 102/201; 200/144 R
[58] Field of Search ..................... 102/201; 200/150 R, 200/144 R, 150 M

[56] References Cited

U.S. PATENT DOCUMENTS

| | | | |
|---|---|---|---|
| 3,362,329 | 1/1968 | Epstein | 102/201 |
| 3,408,937 | 11/1968 | Lewis et al. | 102/201 |
| 3,618,526 | 11/1971 | Baker | 102/201 |
| 3,812,783 | 5/1974 | Yang et al. | 102/201 |
| 3,911,822 | 10/1975 | Boling | 102/201 |
| 4,176,385 | 11/1979 | Dethlefsen | 200/150 R |

FOREIGN PATENT DOCUMENTS 2055930  3/1981  United Kingdom ................ 102/201

OTHER PUBLICATIONS

Yang et al., "Laser Initiation of Explosive Devices"; *National Defense*, pp. 344–347.

*Primary Examiner*—Charles T. Jordan
*Attorney, Agent, or Firm*—Ostrolenk, Faber, Gerb & Soffen

[57] ABSTRACT

A trigger system for chemical actuators, e.g. of the type used for high voltage isolation, is disclosed. A light source, preferably a laser, emits a powerful, highly concentrated pulse of light energy. The pulse is conveyed by fiber optics to a chemical explosive charge, which it detonates. Because the fiber optics used are excellent electrical insulators, it is possible to locate all of the trigger system except the output end of the fiber optics at ground potential, eliminating the need for shielding the trigger system against high-voltage noise.

7 Claims, 2 Drawing Figures

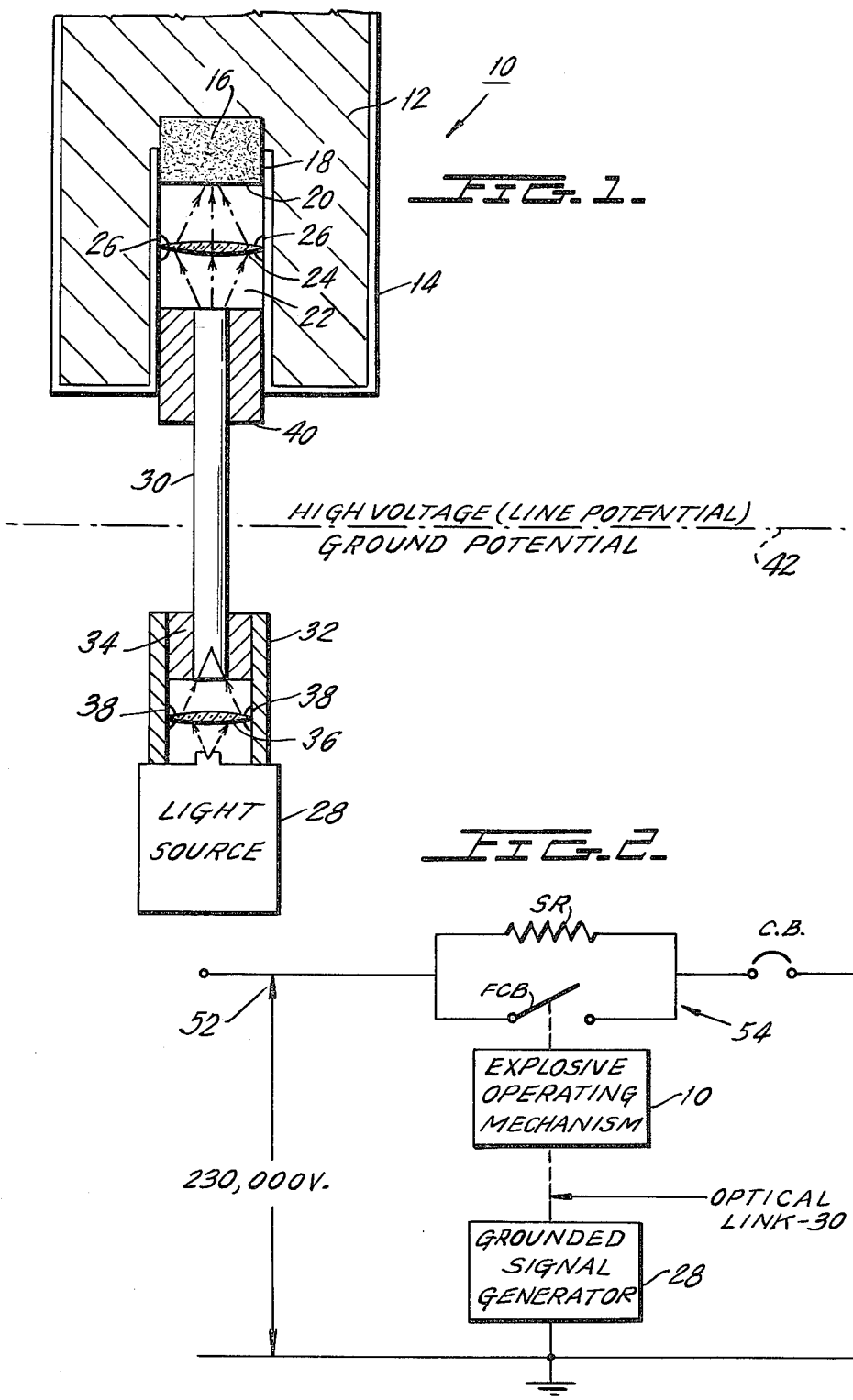

LASER-TRIGGERED CHEMICAL ACTUATOR FOR HIGH VOLTAGE ISOLATION

BACKGROUND OF THE INVENTION

In high-voltage electrical systems, a fault condition can lead to serious damage of the equipment very quickly. It is accordingly very important to actuate a circuit breaker or other protector device as quickly as possible when a fault condition is detected. It is well known to actuate such protective devices by chemical means. Systems employing such chemical actuators are shown in the following copending applications: Ser. No. 887,172, filed Mar. 16, 1978, now U.S. Pat. No. 4,224,491, Peter J. Kroon, for a CHEMICALLY ACTIVATED SWITCH; Ser. No. 889,491, filed Mar. 22, 1978, now U.S. Pat. No. 4,250,365, Lorne D. McConnell, for a CURRENT INTERRUPTOR FOR FAULT CURRENT LIMITER AND METHOD; and Ser. No. 899,539, filed Apr. 24, 1978, Rolf Dethlefson, for EXPLOSIVELY ACTIVATED FAULT CURRENT LIMITER, which issued as U.S. Pat. No. 4,176,385 on Nov. 17, 1979. All of the foregoing are assigned to the Electric Power Research Institute. It is known, for example, to power the open stroke of a circuit breaker by a chemical explosive charge. The charge is typically detonated by electrical means, for example by a power pulse from a capacitor discharge circuit. The capacitor discharge circuit must be located near the switch-actuator assembly and must, in a high-voltage power system, be kept at line potential. The capacitor discharge circuit is highly sensitive to high-level power system noise, against which it must accordingly be heavily shielded.

SUMMARY OF THE INVENTION

The principal object of the present invention is to provide means for triggering a chemical actuator such that the requirement for shielding the triggering device is minimal.

It is a further object of the present invention to provide a chemical actuator trigger system that can be located at ground potential.

It is a further object of the invention to provide a chemical actuator trigger system that need not be physically proximate to the chemical actuator.

It is still another object of the invention to provide a chemical actuator trigger system employing a signal of highly concentrated light energy to attain the foregoing objects. According to the present invention, a laser, laser diode or other suitable light source provides a strong pulse of highly concentrated light to ignite a material embedded in an explosive charge, the rapid combustion of the ignited material serving to detonate the charge. The pulse of light energy is transmitted from the light source to the target material by means of one or more optical fibers. Because optical fibers are excellent insulators, the light source may be maintained at ground potential even though the charge and the equipment to which it is connected may be at 230,000 volts or the like. The low losses occurring during transmission of light by an optical fiber permit the light source to be located anywhere convenient, even at a considerable distance from the chemical actuator.

For the purpose of illustrating the invention, there is shown in the drawing an embodiment which is presently preferred; it is to be understood, however, that the invention is not limited to the precise arrangements and instrumentalities shown.

BRIEF DESCRIPTION OF THE DRAWING

FIG. 1 shows a view, partly in section, of the preferred embodiment of the present invention.

FIG. 2 shows a schematic diagram of a circuit employing the trigger system of the invention to protect a high-voltage line.

DETAILED DESCRIPTION OF THE INVENTION

As shown in FIG. 1, the explosive charge 12, which is the principal component of the chemical actuator 10 to be triggered by the invention, is contained in a housing 14. A charge of fuse material 16 is provided at an orifice 18 at the inner end of shaft 22 located in the housing 14. The fuse 16 is made of a material that can be ignited by a pulse of sufficiently highly concentrated light, and whose combustion produces either sufficient heat or a sufficiently powerful shock wave to detonate the explosive charge 12. Typically, the material of fuse 16 may be lead azide, lead styphnate, or trinitrotoluene.

One surface 20 of the fuse 16 is exposed and is the target of a pulse of highly concentrated light energy produced by the trigger system of the invention. It should be noted that the fuse 16 need not be made of a different material from explosive charge 12, if the explosive material 12 can be satisfactorily detonated by concentrated light. A typical explosive device adapted for use with a fault current limiter is shown in U.S. Pat. No. 4,176,385, referred to above, the disclosure of which is incorporated herein by reference.

Opening 22, provided in the side of housing 14 and exposing surface 20 of fuse 16, also contains a focusing lens 24 for focusing the light pulse on as small a portion of surface 20 as possible. The lens 24 is held in place in opening 22 by support means 26 which can be a cement, and which also serves as an environmental seal.

The trigger system of the invention comprises a light source 28 to generate a high-energy light pulse and one or more optical fibers 30 to convey the pulse to the chemical actuator 10. The light source 28 is preferably a laser but may also be, for example, a laser diode, an array of laser diodes, or an arc lamp. In the preferred embodiment shown in the Figure, an alignment tube 32 is provided at the output of light source 28. The alignment tube 32 holds a fiber optic ferrule 34 which holds the input end of the optical fiber 30. The alignment tube 32 also contains a lens 36, secured to the interior of alignment tube 32 by support means 38, to focus the light pulse from the light source 28 onto the input end of optical fiber 30. In order that none of the light produced by light source 28 be wasted, it is desirable that focusing lens 36 focus all of the output of light source 28 into the cone of acceptance of the input end of optical fiber 30. To this end, the alignment tube 32 aligns the output of light source 28 with the focusing lens 36 and the input tip of the optical fiber 30. The ferrule 34 may be axially slidable within the alignment tube 32, permitting adjustment of the focus.

The other end of optical fiber 30 is fit snugly in a second ferrule 40, which is designed to be inserted into opening 22 of chemical actuator 10 and removably secured there by any convenient known means (not shown). Preferably, ferrule 40 can be inserted in opening 22 to a given depth which may be adjustable and secured there, to permit focusing of the light pulse output by optical fiber 30.

In operation, the light source 28 is actuated either manually, or by a signal emitted by a fault condition detector (not shown) to indicate the presence of a fault condition requiring the operation of a protective device actuated by chemical actuator 10. The light source 28 emits a high-power pulse of highly concentrated light, which is focused by lens 34 on the input end of optical fiber 30, which is made of a material whose properties provide a cone of acceptance (nominal numerical aperture) to maximize the amount of energy coupled with optical fiber 30. Typically the fiber 30 may be a borosilicate glass fiber optic bundle housed in a high density inert polymer jacket or a single "macro" fiber having a core of 400 or 600 microns and formed from a synthetic water-free fused silica.

The optical fiber 30, which is preferably an extremely low absorption fiber (less than 5 db/km) with a high input power at the wavelength or wavelengths of light emitted by the light source 28, carries the light pulse to chemical actuator 10. The light pulse, upon leaving the output end of optical fiber 30, is focused by lens 24 on the target area of fuse 16.

As is indicated by the dashed line 42, the trigger system of the present invention, with the exception only of the output end of optical fiber 30 and the ferrule 40 used to connect the fiber 30 to the chemical actuator 10, can be located at ground potential. This is possible due to the good electrical insulative properties of the optical fiber 30 and eliminates the necessity of shielding the trigger system from the high-level noise associated with line potential, which, as noted above, may reach several hundred thousand volts.

FIG. 2 shows schematically a chemical actuator system, employing the optical trigger system of the present invention and protecting a 230 kV line 52 against fault currents. The high-voltage line 52 is provided with a fault current limiter 54, which includes a shunt resistance SR and a fast-acting circuit breaker FCB connected in parallel with each other. A circuit breaker CB is connected in series with the fault current limiter 54. The fast-acting breaker FCB is actuated by the chemical explosive operating mechanism 10. When a fault condition is detected, the grounded optical signal generator 28 is caused to emit a powerful optical signal via optical link 30 to detonate the explosive mechanism 10, opening the fast circuit breaker FCB of the fault current limiter 54 in a known manner.

As is clear from FIG. 2, the optical signal generator 28 is at ground potential, with the result that it need not be shielded from the high-level noise that would occur at line potential.

If a laser is used as the light source 28, the wavelengths preferred are at 0.85 μm, 0.95 μm and 1.06 μm, although it will be clear that any other convenient wavelength could be used as well. The optical fiber 30 should be made of a material having low absorption at the selected wavelengths.

Although a preferred embodiment of the invention has been described in detail, many modifications and variations thereof will now be apparent to one skilled in the art. Accordingly, the scope of the present invention is to be limited not by the details of the preferred embodiment herein described but only by the terms of the appended claims.

What is claimed is:

1. An optically triggered chemical actuator system for actuating electrical apparatus at high potential relative to ground potential comprising:

a laser optical source means mounted at ground potential and operable to produce a high intensity optical signal;

a chemical actuator means fixed to electrical apparatus mounted at high potential relative to said ground potential and operable in response to a high intensity optical signal to cause an operation of said electrical apparatus; and a single elongated electrically insulative optical fiber means having a first end thereof connected to said laser at ground potential and a second end thereof connected to said chemical actuator means at high potential for conveying said signal produced by said laser optical source means to said chemical actuator means.

2. The actuator system of claim 1, further comprising means for focusing said signal on a first end of said optical fiber means after said signal leaves said optical source means.

3. The actuator system of claim 2, further comprising means for focusing said signal on said chemical actuator means.

4. The actuator system of claim 2 or claim 3, further comprising means for adjustably aligning said optical source means with said optical fiber means.

5. The actuator system of claim 4, further comprising means for detachably securing said optical fiber means to said chemical actuator means.

6. The actuator system of claim 1 or claim 3, wherein said chemical actuator means comprises a first region made of a first material for ignition by said signal generated by said optical source means, and a second region continuous with said first region and made of a second material for detonation responsive to ignition of said first material by said signal.

7. The system of claim 1, wherein said electrical apparatus consists of a fault current limiting device.

* * * * *